United States Patent
Vinot et al.

(10) Patent No.: US 10,985,561 B2
(45) Date of Patent: Apr. 20, 2021

(54) METHOD FOR MONITORING AND CONTROLLING AN ELECTRICAL NETWORK

(71) Applicant: Schneider Electric Industries SAS, Rueil Malmaison (FR)

(72) Inventors: Benoit Vinot, Grenoble (FR); Nicolas Gast, Gieres (FR); Florent Cadoux, Bernin (FR); Rodolphe Heliot, Saint Martin le Vinoux (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 175 days.

(21) Appl. No.: 16/125,106

(22) Filed: Sep. 7, 2018

(65) Prior Publication Data
US 2019/0081478 A1    Mar. 14, 2019

(30) Foreign Application Priority Data
Sep. 12, 2017 (FR) ...................... 17 58419

(51) Int. Cl.
*H02J 3/00* (2006.01)
*H02J 3/14* (2006.01)
*G06Q 50/06* (2012.01)
*G06N 3/08* (2006.01)
(Continued)

(52) U.S. Cl.
CPC .................. *H02J 3/14* (2013.01); *G06N 3/08* (2013.01); *G06Q 10/06* (2013.01); *G06Q 50/06* (2013.01); *H02J 3/003* (2020.01); *H02J 3/382* (2013.01); *H02J 2203/20* (2020.01)

(58) Field of Classification Search
None
See application file for complete search history.

(56) References Cited

U.S. PATENT DOCUMENTS

| 2012/0109400 A1 | 5/2012 | Sundaram et al. |
| 2013/0204451 A1 | 8/2013 | Staehle |
| 2015/0127179 A1 | 5/2015 | Binding et al. |

(Continued)

FOREIGN PATENT DOCUMENTS

| FR | 3 028 080 A1 | 5/2016 |
| WO | WO 2013/093794 A2 | 6/2013 |
| WO | WO 2016/135771 A1 | 9/2016 |

OTHER PUBLICATIONS

French Preliminary Search Report dated May 9, 2018 in French Application 17 58419 filed on Sep. 12, 2017 (with English Translation of Categories of Cited Documents and Written Opinion).

*Primary Examiner* — Paul B Yanchus, III
(74) *Attorney, Agent, or Firm* — Oblon, McClelland, Maier & Neustadt, L.L.P.

(57) ABSTRACT

A method for monitoring and controlling an electrical network that includes at least one transformer station delimiting a medium-voltage sub-network and a low-voltage sub-network and a plurality of entities that are connected to a determined voltage in the low-voltage sub-network, each entity being a consumer and/or a producer of electricity in the low-voltage sub-network. The method includes determining control data on the production and/or on the consumption of electricity to be applied to one or more entities of the low-voltage sub-network taking into account previously determined production and/or consumption quotas.

18 Claims, 2 Drawing Sheets

(51) Int. Cl.
*G06Q 10/06* (2012.01)
*H02J 3/38* (2006.01)

(56) References Cited

U.S. PATENT DOCUMENTS

2018/0025443 A1   1/2018  Chakraborty et al.
2018/0048154 A1*  2/2018  Guo ................. H02J 13/00002

* cited by examiner

Fig. 4C

METHOD FOR MONITORING AND CONTROLLING AN ELECTRICAL NETWORK

TECHNICAL FIELD OF THE INVENTION

The present invention relates to a method for monitoring and controlling an electrical network that includes at least one transformer station between a medium-voltage sub-network and a low-voltage sub-network.

The invention also relates to the monitoring and control system that makes it possible to implement said method.

PRIOR ART

There are nowadays many solutions that make it possible to monitor and control an electrical network, in particular to confer a certain degree of flexibility thereon. Currently, it is specifically a matter of taking into account not only the electricity consumption of each entity of the electrical network but also the possible electricity production of various entities of the network (via solar panels for example) and the physical constraints of the network (overvoltage, undervoltage, overcurrent, etc.). Depending on these constraints, it will indeed sometimes be necessary to act on the production and/or consumption of one or more entities of the network.

Conventionally, to control an electrical network in such a way, a control centre is based for example on the plan of the electrical network and makes use of load flow or optimal power flow methods, which make it possible to determine the power flow in the various branches of the electrical network so as potentially to act on the entities of the network.

However, the network plan is not always available or may be erroneous, thereby inevitably leading to control errors. Moreover, the prior solutions are not always suitable for all encountered operating situations. They may thus act on the network in an inadequate, or even counterproductive, manner. Concrete examples will in particular be presented at the end of the description.

The document entitled "*Efficient Computation of Sensitivity Coefficients of Node Voltages and Line Currents in Unbalanced Radial Electrical Distribution Networks*"— Konstantina Christakou, Jean-Yves Le Boudec, Mario Paolone, Dan-Cristian Tomozei", describes an optimized network control principle, based on the creation of influence matrices for each operating point, on the basis of a network plan.

However, this prior solution has proven to be quite unreliable, which is linked to the fact that it uses a network plan as the basis for constructing the matrices, and difficult to implement since it requires a distinct matrix for each operating point.

The object of the invention is therefore to provide a method for monitoring and controlling an electrical network, which method is reliable, efficient in terms of implementing actions at the level of the entities of an electrical network that are suited to the constraints of the electrical network and which method does not require the use of an electrical network plan to operate, thus avoiding inadequate operation in the event of an error in a network plan.

SUMMARY OF THE INVENTION

This object is achieved by a method for monitoring and controlling an electrical network that includes at least one transformer station delimiting a medium-voltage sub-network and a low-voltage sub-network and a plurality of entities that are connected to a determined voltage in the low-voltage sub-network, each entity being a consumer and/or a producer of electricity in the low-voltage sub-network, said method being implemented by a monitoring and control system comprising at least one processing unit, said method including:
- a step of acquiring an amount of electrical power consumed and/or produced by each entity of the low-voltage sub-network at successive time intervals;
- a step of determining, at each new time interval, a production and/or consumption quota to be attributed to each entity;
- a step of determining a minimum and a maximum production and/or consumption quota value to be observed for each entity taking into account the amount of electrical power consumed and/or produced at a time interval preceding said new time interval;
- a step of determining a projected consumed and/or produced amount of electrical power for each entity, based on said consumed and/or produced amount of electrical power acquired at a time interval preceding said new time interval;
- said production and/or consumption quota being a solution to an optimization problem taking into account:
  - at least one unique data model acquired by learning, applied at each new time interval and including data that are representative of an effect of the amount of electrical power consumed and/or produced by each entity on at least one monitored electrical quantity;
  - technical constraints to be observed for said at least one monitored quantity;
  - said determined minimum and maximum production and/or consumption quota values;
  - said determined projected consumed and/or produced amount of electrical power for each entity;
  - an optimization function selected to allocate the production and/or consumption quotas to the entities;
- a step of determining control data on the production and/or on the consumption of electricity to be applied to one or more entities of the low-voltage sub-network taking into account each determined production and/or consumption quota.

According to one particular aspect of the invention, said at least one monitored electrical quantity corresponds to the voltage standard of each entity at its connection point.

According to another particular aspect of the invention, said constraints to be observed for said at least one monitored electrical quantity correspond to a minimum voltage value and a maximum voltage value for each entity.

According to another aspect of the invention, said at least one monitored electrical quantity corresponds to the electrical power passing through the transformer station.

According to another aspect of the invention, said constraints to be observed for said at least one monitored electrical quantity correspond to a minimum value of power passing through the transformer and a maximum value of power passing through the transformer station (P).

According to another aspect of the invention, said at least one monitored electrical quantity corresponds to the standard for the amperage passing through a cable.

According to another aspect of the invention, said optimization function is selected from:
- maximizing the sum of the production and/or consumption quotas attributed to the entities;

maximizing the equity of the consumption restrictions between the entities; or maximizing the logarithm of the power attributed to each entity (Ei).

According to another aspect of the invention, the step of determining a minimum and a maximum production and/or consumption quota value to be observed for each entity is carried out while taking into account technical data relating to each entity, selected from one or more of the following data:

a level of power attributed to each entity according to its supply contract;

data relating to the electricity production solution installed within each producer entity;

a maximum amount of cappable power or energy per entity;

data relating to the storage capacity of the entity if this entity is a producer.

According to another aspect of the invention, the method includes a step of determining the number of new electrical data on the electrical network and a step of updating said at least one data model of the electrical network when enough acquired electrical data are available.

The invention also relates to a method for monitoring and controlling an electrical network that includes at least one transformer station delimiting a medium-voltage sub-network and a low-voltage sub-network and a plurality of entities that are connected to a determined voltage in the low-voltage sub-network, each entity being a consumer and/or a producer of electricity in the low-voltage sub-network, said system including:

a module for acquiring an amount of electrical power consumed and/or produced by each entity of the low-voltage sub-network at successive time intervals;

a control module configured:
  to determine, at each new time interval, a production and/or consumption quota to be attributed to each entity;
  to determine a minimum and a maximum production and/or consumption quota value to be observed for each entity taking into account the amount of electrical power consumed and/or produced at a time interval preceding said new time interval;
  to determine a projected consumed and/or produced amount of electrical power for each entity, based on said consumed and/or produced amount of electrical power acquired at a time interval preceding said new time interval;
  said production and/or consumption quota (q) being a solution to an optimization problem taking into account:
    at least one unique data model acquired by learning, applied at each new time interval and including data that are representative of an effect of the amount of electrical power consumed and/or produced by each entity on at least one monitored electrical quantity;
    technical constraints to be observed for said at least one monitored quantity;
    said determined minimum and maximum production and/or consumption quota values;
    said determined projected consumed and/or produced amount of electrical power for each entity;
    an optimization function selected to allocate the production and/or consumption quotas to the entities;
  to determine control data on the production and/or on the consumption of electricity to be applied to one or more entities of the low-voltage sub-network taking into account each determined production and/or consumption quota.

According to one particularity of the system, said at least one monitored electrical quantity corresponds to the voltage standard of each entity at its connection point.

According to another particularity of the system, said constraints to be observed for said at least one monitored electrical quantity correspond to a minimum voltage value and a maximum voltage value for each entity.

According to another particularity of the system, said at least one monitored electrical quantity corresponds to the electrical power passing through the transformer station.

According to another particularity of the system, said constraints to be observed for said at least one monitored electrical quantity correspond to a minimum value of power passing through the transformer and a maximum value of power passing through the transformer station.

According to another particularity of the system, said at least one monitored electrical quantity corresponds to the standard for the amperage passing through a cable.

According to another particularity of the system, said optimization function is selected from:

maximizing the sum of the production and/or consumption quotas attributed to the entities;

maximizing the equity of the consumption restrictions between the entities; or maximizing the logarithm of the power attributed to each entity.

According to another particularity of the system, the control module is configured to determine a minimum and a maximum production and/or consumption quota value to be observed for each entity while taking into account technical data relating to each entity, selected from one or more of the following data:

a level of power attributed to each entity according to its supply contract;

data relating to the electricity production solution installed within each producer entity;

a maximum amount of "cappable" power or energy per entity;

data relating to the storage capacity of the entity if this entity is a producer.

According to another particularity of the system, it includes a learning module configured to determine a number of new electrical data on the electrical network and an operation of updating said at least one data model of the electrical network when enough acquired electrical data are available.

BRIEF DESCRIPTION OF THE FIGURES

Other features and advantages will appear in the following detailed description given with regard to the appended drawings, in which.

DETAILED DESCRIPTION OF AT LEAST ONE EMBODIMENT

Figure 1:
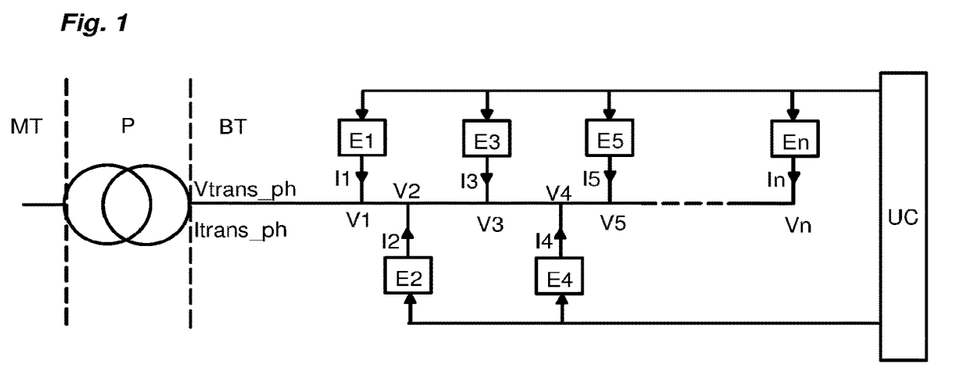
FIG. 1 schematically shows a simplified electrical network to which the monitoring and control method of the invention may be applied and the monitoring and control system of the invention used to monitor such an electrical network.

With reference to FIG. 1, the invention applies to an electrical network that includes at least one MV/LV transformer station P thus delimiting a low-voltage LV sub-network and a medium-voltage MV sub-network.

The low-voltage sub-network includes multiple entities Ei (of rank i, where i ranges from 1 to n and n is greater than or equal to 2), which will each be a consumer and/or a producer of an amount of electrical power.

The term "entity" Ei should be understood for example to mean, nonlimitingly, a dwelling, a group of dwellings, at least one factory, at least one power station, for example a photovoltaic power station or wind power station, or a combination of these various entities, for example a dwelling fitted with photovoltaic panels for producing electricity. Each entity Ei will include or will be associated with a control unit responsible for performing appropriate actions taking into account received control data, for example production and consumption capping actions. A capping action will thus consist in limiting the production or consumption of an entity.

By way of example, the electrical network shown in FIG. 1 thus includes n entities Ei.

Nonlimitingly, the network shown in the figure includes n entities Ei that are connected to the transformer station P via a network branch. It should be understood that the low-voltage sub-network may include multiple branches and that each network branch is single phase or polyphase.

In the low-voltage sub-network, each entity Ei is characterized by the following information:
  producer and/or consumer of an amount of electrical power;
  identity of the connection phase of the entity in the low-voltage sub-network.

Figure 2:
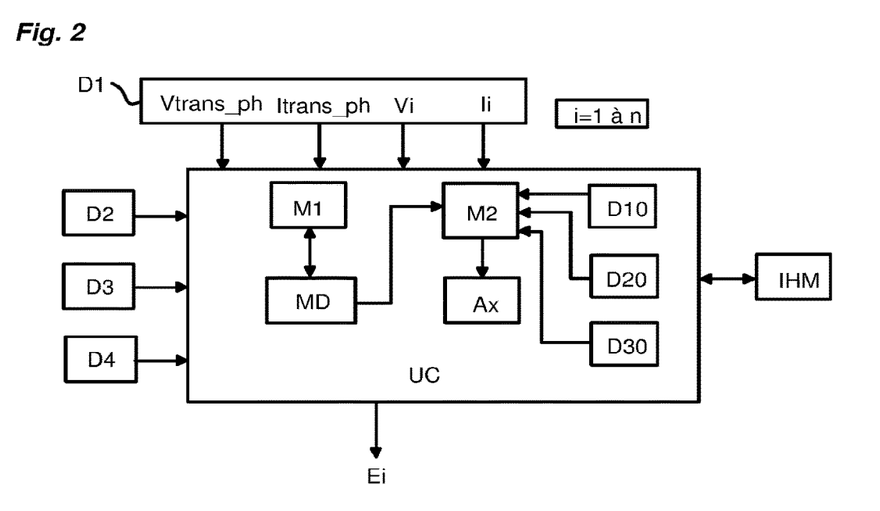
FIG. 2 schematically shows the monitoring and control system of the invention and its operating principle.

FIG. 2 shows a system for monitoring and controlling such an electrical network.

This monitoring and control system includes a processing and control unit UC responsible for implementing the following functions:
  execution of a module for acquiring measurement data D1;
  execution of a learning module M1 for constructing and updating a data model MD;
  execution of a control module M2 for determining a suitable control for the electrical network;
  execution of a module for recording various data linked to each entity Ei and to the transformer station P of the electrical network.

The modules are software modules configured to be executed by the processing and control unit UC. They are stored on any known and executable computer medium.

The processing and control unit UC typically includes a microprocessor and storage means. It advantageously includes multiple inputs that are intended to be connected to measurement means, such as sensors, and outputs that are intended to be connected to control units that are each dedicated to the control of one distinct entity Ei. Of course, other devices could be connected to the inputs/outputs of the processing and control unit UC.

The various data recorded by the recording module could be in particular:
  technical data D10 connected to the electrical network; or
  data D20 relating to each entity of the low-voltage sub-network.

The technical data D10 may be limit values that can be accepted by the transformer station P and/or minimum and maximum acceptable voltages of the electrical network.

The data D20 relating to each entity may be the power level attributed to each entity according to its supply contract, data relating to the electricity production solution installed within each producer entity (for example the solar panel area, etc.), the maximum amount of cappable power or energy per entity and/or data relating to the storage capacity of the entity Ei if this entity is a producer, etc.

The monitoring and control system may include a human-machine interface HMI for setting parameters for the system and in particular the input for recording the data D10, D20 linked to each entity Ei of the low-voltage sub-network.

The monitoring and control system may include means for measuring one or more electrical quantities at the level of each entity of the low-voltage sub-network. These measurement means are connected to said data acquisition module.

These measurement means are advantageously current sensors (for determining each current Ii) and voltage sensors (for determining each voltage Vi) that are positioned suitably, in particular on the main power supply circuit of each entity Ei and at the point of connection of each entity Ei on the low-voltage sub-network. Any other sensor could be used, such as energy sensors making it possible to calculate the electrical energy consumed by the entity and to send it to a dedicated central unit (a data collection server) or directly to the processing and control unit UC.

The execution of the control module M2 is configured to implement, at least in part, the monitoring and control method of the invention.

According to one particular aspect of the invention, the monitoring and control method of the invention thus consists in monitoring the electrical network primarily so as to determine consumption and/or production control data to be sent to one or more entities Ei of the low-voltage sub-network. Other control data could be sent, such as for example:
  control data for storing energy to be sent to a producer entity possessing free storage capacity;
  control data for releasing energy to be sent to one or more producer entities of the network, if the supply by the network were to be interrupted or limited upstream of the transformer station P;
  control data for modifying a consumption and/or production trip threshold.

To operate, the control module M2 is based on at least one data model MD1 and/or MD2 obtained as the result of a learning operation and able to be updated regularly when enough new acquired data (for example acquired by means of measurements) become available.

The learning operation is implemented by the learning module M1 executed by the processing and control unit UC.

Upon completion of the learning operation, each data model MD1, MD2 is unique for one set of operating points.

To create the data model MD1, MD2, the learning module M1 uses data acquired by the processing and control unit UC.

These data may be:
  data D2 from a history of measurements by sensors at the level of the transformer station P;

data D3 from a history of measurements by sensors at the level of the entities Ei of the network;

data D4 from a history of measurements by various sensors, for example on various branches of the network;

the data D1 from the latest measurements made by all of the sensors of the network at the level of the various branches of the network, at the level of each entity Ei of the network and/or at the level of the transformer station.

In the event no data history is present, the data are acquired by measurement, by virtue of the measurement means described above, over a learning duration of variable length depending on the size of the electrical network to be monitored and depending on the sampling period. This duration may be for example 24 hours, several days or even several months. The sampling period for acquiring the measurements may be adjustable.

To construct the data model MD1, MD2, the data used by the processing and control unit UC (from a history and/or measured over the learning duration) are at least the following:

the active power consumed and/or produced by each entity Ei of the low-voltage sub-network;

the voltage standard for each entity Ei;

the electrical power passing through the transformer station P of the network.

These data are acquired over time, thus defining multiple successive operating points.

Advantageously, the acquired data are synchronized with each other so as to form said operating points.

By way of nonlimiting example, the acquired data are RMS (root mean square) data.

By way of example, the first table below shows a history of data measured in the low-voltage sub-network, each client corresponding to a distinct entity Ei:

| Date | Client N° | Electrical bus N° | Phase | Power (W) | Voltae (V) |
|---|---|---|---|---|---|
| — | — | — | — | — | — |
| 2017-01-01 08:00:00 | 1 | 1 | a | 1005 | 231.2 |
| 2017-01-01 08:00:00 | 2 | 1 | b | 2223 | 235.6 |
| 2017-01-01 08:00:00 | 3 | 2 | a | −856 | 245.9 |
| 2017-01-01 08:00:00 | 4 | 17 | c | 8569 | 212.4 |
| — | — | — | — | — | — |
| 2017-01-01 08:10:00 | 1 | 1 | a | 875 | 228.4 |
| 2017-01-01 08:10:00 | 2 | 1 | b | 1850 | 232.4 |
| 2017-01-01 08:10:00 | 3 | 2 | a | −654 | 229.8 |
| 2017-01-01 08:10:00 | 4 | 17 | c | 7506 | 212.4 |
| — | — | — | — | — | — |

In this table, it is possible to see the amount of power consumed or produced (if negative) by each entity as well as the voltage at their connection point (phase) at various instants in time, each instant in time thus defining a distinct operating point.

By way of example, the second table below shows a history of data measured at the level of the transformer station:

| Date | Phase | Amperage (A) | Voltage (V) |
|---|---|---|---|
| — | — | — | — |
| 2017-01-01 08:00:00 | a | 43.5 | 231.2 |
| 2017-01-01 08:00:00 | b | 56.1 | 234.2 |
| 2017-01-01 08:00:00 | c | −10.3 | 228.4 |
| — | — | — | — |
| 2017-01-01 08:10:00 | a | 57.2 | 228.2 |
| 2017-01-01 08:10:00 | b | 59.9 | 230.1 |
| 2017-01-01 08:10:00 | c | −5.3 | 230.8 |
| — | — | — | — |

This second table shows the voltage per phase at the secondary (LV side) of the transformer station, as well as the amperage passing through the transformer station (also measured at the secondary) at the same instants in time as those defined above. This amperage may, be negative in the case of electricity production by one or more entities of the low-voltage sub-network.

Once enough data have been acquired, the learning module M1 applies a learning algorithm to a data pair, this pair being chosen according to the technical constraints to be observed.

By way of example, it may be one of the following data pairs:

active power consumed and/or produced per entity/voltage standard for each entity. This thus makes it possible to control the voltage at the point of connection of each entity.

active power consumed or produced per entity/power passing through the transformer station. This makes it possible to ensure that the power passing through the transformer is correct.

Active power consumed or produced by each entity/standard for the amperage passing through a cable. This makes it possible to ensure that the standard for the amperage passing through this cable is correct.

For processing the acquired data, the learning module may implement a learning algorithm in the form of linear regression. Any other suitable algorithm could be used (e.g. neural network, etc.).

For all of the operating points, the learning module M1 constructs a single data model, one operating point corresponding to all of the measurements made at a given instant in time (corresponding to the date column in the tables above).

Thus, for the target data pair, a unique data model in the form of a matrix is obtained. According to the control carried out, a single matrix will then be used for controlling this data pair, regardless of the operating point.

More generally, for the first data pair mentioned above, the learning module M1 thus generates a data model MD1 that includes:

data that are representative of the effect of the amount of power consumed and/or produced by each entity on the voltage standard of the other entities of the low-voltage sub-network.

For the second data pair mentioned above, the learning module M1 thus generates a data model MD2 that includes:

data that are representative of the effect of the amount of power consumed and/or produced by each entity on the power passing through the transformer station.

Each data model teaches the effect of the amount of power consumed or produced by the entities on the other parameter of the data pair.

In the data model MD1, the matrix (denoted by $A_{u}$) thus includes multiple columns, each column x being dedicated to one distinct entity Ei of the low-voltage sub-network, and multiple rows, each row also being dedicated to one distinct entity Ei of the low-voltage sub-network. The columns and rows of the matrix are then filled in by coefficients. In each column, the coefficients Cxy represent the effect of the amount of power consumed or produced by an entity of the low-voltage sub-network given in a column on the monitored value of each of the other entities of the low-voltage sub-network given on each row.

By way of example, such a matrix, shown in the form of a table, is as follows:

|    | E1  | E2  | E3  | Ei  | En  |
|----|-----|-----|-----|-----|-----|
| E1 | C11 | C21 | C31 | Ci1 | Cn1 |
| E2 | C12 | C22 | C32 | Ci2 | Cn2 |
| E3 | C13 | C23 | C33 | Ci3 | Cn3 |
| Ei | C1i | C2i | C3i | Cii | Cni |
| En | C1n | C2n | C3n | Cin | Cnn |

For example, in the case of a linear learning operation, a column x of the matrix $A_u$ represents the effect of the net consumption of an entity Ex of the low-voltage sub-network on the voltage standard for all of the other entities of the same network given on each row. Thus, a coefficient −0.5 at position (x; y) in this matrix indicates that if the entity Ex increases its consumption by 1 kW, the voltage for another entity Ey of the sub-network decreases by 0.5 V.

By virtue of the data model, it is thus possible to ensure that increasing a production (or consumption) quota of one entity does not risk causing the voltage of another entity to fall outside of the permitted limits.

The same operation applies to the data model MD2 (represented by a matrix $A_p$), in which each column represents the effect of the production or consumption of an entity of the low-voltage sub-network on the power passing through the transformer station P.

Of course, data other than those defined above could also be acquired (by measurement or otherwise) to enrich the data model. Nonlimitingly, these could be measurements of amperage in a particular line of the electrical network, or measurements connected to another transformer station included in the electrical network.

During the implementation of the monitoring and control method, the control module M2 is configured to determine the control data to be sent to the entities Ei on the basis of the latest acquired data D1, received as input, and the data already possessed by the processing and control unit UC.

To achieve this, the control module M2 determines the production quota $q_{prod\_i}$ and/or the consumption quota $q_{cons\_i}$ be allocated to each entity of the electrical network. It puts an optimization principle in place. The optimization principle makes it possible to determine the best quotas to be sent to the entities Ei of the network. Stated otherwise, it will be a matter of finding a solution that is capable of satisfying the target optimization principle and hence of determining all of the quotas that allow an optimization objective to be met. This objective is defined by an objective function f. It will for example be a matter of determining the production quota $q_{prod\_i}$ or the consumption quota $q_{cons\_i}$ to be allocated to each entity Ei that makes it possible:

to maximize the sum of the quotas attributed to the entities;
 to maximize the equity of the consumption restrictions between the entities; or
 to maximize the sum of the logarithm of the power attributed to each entity.

According to the one or more data pairs being monitored, the control module M2 uses one or more of the following measured values over time:

amount of (active, potentially reactive) electrical power consumed and/or produced (whether the two are measured independently or just the sum is actually reported) by one or more entities of the network;
 amount of electrical power passing through a branch of the electrical network, through an entity Ei and/or through the transformer station P;
 voltage standard Vi for one or more entities of the low-voltage sub-network at its connection point;
 detailed voltage (real part+imaginary part) for one or more entities at their connection point;
 standard for the amperage flowing through one or more branches of the network;
 detailed amperage (real part+imaginary part) in one or more branches of the network.

The control module M2 operates in successive time intervals, preferably all of which are of identical duration. For each new time interval, the control module M2 is responsible for determining the production quota $q_{prod\_j}$ and the consumption quota $q_{cons\_i}$ to be allocated to each entity Ei. The control module M2 separately determines the production quota and the consumption quota to be allocated to each entity. Of course, if no entity of the monitored network is a producer, determining production quotas will be pointless, and vice versa.

To determine the production quota $q_{prod\_i}$ to be allocated to each entity Ei, the control module M2 implements the following steps:

it acquires measurement data D1 on the amount of power consumed and/or produced for each entity Ei of the network; these data are measured at successive time intervals (for example every 10 minutes) by the measurement means;
 it determines, for each entity Ei, the minimum $q^{min}(t)$ and the maximum $q^{max}(t)$ production quota value that it can attribute to the entity Ei; to set these limit values, it may in particular use the production data measured at the preceding time interval for this entity Ei;
 it determines, for each entity Ei, a projection for the amount of power consumed $\widetilde{p_{cons}}(t)$ by each entity Ei for this new time interval; this projection is for example produced by taking into account power data measured at one or more preceding time intervals;
 it inserts these data into an optimization problem taking into account the various constraints set in the preceding steps;
 solving the optimization problem makes it possible for it to obtain the production quota $q_{prod\_i}$ to be allocated to each entity Ei of the network;
 optionally, the quota obtained for each entity Ei may be corrected.

These various steps are implemented in an identical manner to determine the consumption quota $q_{cons\_i}$ to be allocated to each entity Ei, the consumed power projection $\widetilde{p_{cons}}(t)$ being replaced with a produced power projection $\widetilde{p_{prod}}(t)$ In the optimization problem, the control module uses at least one data model (MD1 or MD2 learnt during the learning phase, corresponding to the monitored data pair.

The optimization problem managed by the control module M2 when determining the production quotas and then the consumption quotas to be allocated to the n entities Ei of the network is described below. Nonlimitingly, these optimization problems are set up on the basis of the two data models MD1 and MD2 taken in combination, but it should be understood that they could be set up on the basis of only one of the two Models if a single data pair were being monitored. Conversely, other data models corresponding to other monitored data pairs could also be incorporated. The reasoning is based on the n entities Ei.

Production Quota

For production, the optimization problem to be solved is as follows:

$$\begin{cases} \max_{q \in R^n} f(q) & (1) \\ u^{min} \le A_u(\widetilde{p_{cons}}(t) - q) + b_u \le u^{max} \\ p_{trans}^{min}(t) \le A_p(\widetilde{p_{cons}}(t) - q) + b_p \le p_{trans}^{max} \\ q^{min}(t) \le q \le q^{max}(t) \end{cases}$$

where:

q is the production quota to be allocated for the time interval t for the n entities, of the network (q including multiple quotas $q_{prod\_i}$);

f is the objective function, which depends, on the quota that is allocated to each entity:

$p_{cons}(t-1)$ and $p_{prod}(t-1)$ are the power measurements in, terms of consumption, and production at the preceding time interval (t−1);

$\widetilde{p_{cons}}(t)$ is a consumption projection for the entities of the network for the next time interval (t). This prediction may depend on other measured values (in particular $p_{cons}(t-1)$ and $p_{prod}(t-1)$);

$u^{min}$ and $u^{max}$ are the minimum and maximum acceptable voltage values for each entity of, the network, corresponding to data D10 mentioned above;

$p_{trans}^{min}$ and $p_{trans}^{max}$ are the minimum and maximum acceptable power values at the level of the transformer, corresponding to data D10 mentioned above;

$q^{min}(t)$ and $q^{max}(t)$ correspond to the minimum and maximum quota values that can be attributed to each entity. They are time-dependent values and are adjusted before solving equation (1) above. They may be selected according to the measurements made at the preceding time interval ($p_{cons}(t-1)$ and $p_{prod}(t-1)$), but also according to the various, items of information (data D20) on the entities and their electrical installations (peak power of the solar installations; acceptable power for their breaker, etc.) or else contractual data;

$(A_p, b_p)$ and $(A_u, b_u)$ are the matrices of the data models MD1, MD2 learnt during the learning phase.

Consumption Quota

For consumption, the optimization problem to be solved is as follows:

$$\begin{cases} \max_{q \in R^n} f(q) & (2) \\ u^{min} \le A_u(q - \widetilde{p_{prod}}(t)) + b_u \le u^{max} \\ p_{trans}^{min}(t) \le A_p(q - \widetilde{p_{prod}}(t)) + b_p \le p_{trans}^{max} \\ q^{min}(t) \le q \le q^{max}(t) \end{cases}$$

where:

q is the consumption quota to be allocated for the time interval t for the n entities of the network (q including multiple quotas $q_{cons\_i}$);

f is the objective function, which depends on the quota that is allocated to each entity. It may differ from the function f of equation (1);

$\widetilde{p_{prod}}(t)$ is a consumption projection for the entities of the network for the next time interval (t). This prediction may depend on other measured values (in particular $p_{cons}(t-1)$ and $p_{prod}(t-1)$);

$u^{min}$ and $u^{max}$ are the minimum and maximum acceptable voltage values for each entity of the network, corresponding to data D10 mentioned above;

$p_{trans}^{min}$ and $p_{trans}^{max}$ are the minimum and maximum acceptable power values at the level of the transformer, corresponding to data D10 mentioned above;

$q^{min}(t)$ and $q^{max}(t)$ correspond to the minimum and maximum quota values that can be attributed to each entity. They are different from those defined for production but depend on the same factors. They may specifically be selected according to the measurements made at the preceding time interval ($p_{cons}(t-1)$ and $p_{prod}(t-1)$), but also according to the various items of information (data D20) on the entities and their electrical installations (peak power of the solar installations, acceptable power for their breaker, etc.) or else contractual data;

$(A_p, b_p)$ and $(A_u, b_u)$ are the matrices of the data models MD1, MD2 learnt during the learning phase.

Nonlimitingly, the "objective" function consists, for example, in optimizing electrotechnical criteria such as decreasing losses, maximizing the sum of the power produced by the entities, maximizing the minimum quota assigned to the entities Ei, maximizing the logarithm of the power assigned to each entity, etc.

The control module M2 next determines the control date Dx to be sent to one or more of the entities according to the production and/or consumption quota ($q_{prod\_i}$, $q_{cons\_i}$) determined for each entity of the network using the reasoning described above. On the basis of the received control data, a control unit associated with each entity Ei will be able to perform, appropriate actions (capping, load shedding, etc.).

Figure 3:
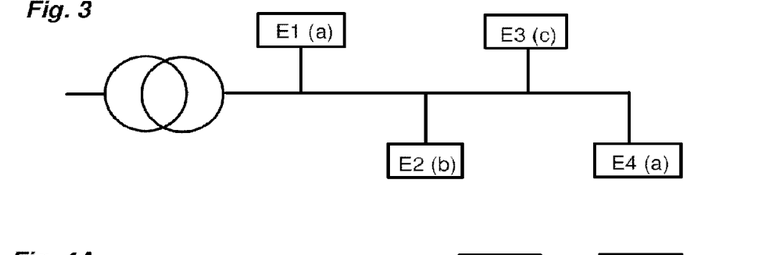
FIGS. 3 and 4 show various operating cases to which the method of the invention applies.

With reference to FIGS. 3 and 4, several examples of implemented control operations are described in detail below.

First Operating Case—FIG. 3

The simplified network of FIG. 3 is considered. It consists of at least the four depicted entities E1-E4, connected on one single branch of the network. The first three entities are consumers and producers and the entity E4 is a consumer only.

The entity E1 is connected to the phase (a) of the low-voltage sub-network;

the entity E2 is connected to the phase (b) of the low-voltage sub-network;

the entity E3 is connected to the phase (c) of the low-voltage sub-network;

the entity E4 is connected to the phase (a) of the low-voltage sub-network.

On a sunny day, the solar panels of the entities E1, E2 and E3 inject a huge amount of power into the network and consequently the voltage along the main line increases to reach its maximum on the phase (a) at the level of the entity E4.

In this operating case, the data model MD1, shown in the form of the matrix Au, would be as follows:

| Client (phase) | 1 (a) | 2 (b) | 3 (c) | 4 (a) |
|---|---|---|---|---|
| 1 (a) | −0.5 | 0.05 | 0.08 | −0.2 |
| 2 (b) | 0.08 | −0.55 | 0.05 | 0.04 |

-continued

| Client (phase) | 1 (a) | 2 (b) | 3 (c) | 4 (a) |
|---|---|---|---|---|
| 3 (c) | 0.09 | 0.05 | −0.6 | 0.03 |
| 4 (a) | −0.3 | 0.04 | 0.01 | −0.4 |

One common strategy would consist in capping the producer entity closest to the entity E4, i.e. the entity E3. However, E3 is connected on the phase (c). Capping its production would therefore lead to a (slight) increase in the voltage on the phase (a) instead of decreasing it.

Specifically, it is observed that on the fourth column of the matrix Au, an increase in the consumption of the entity E4 by one watt:
- decreases the voltage for the entity E1 by 0.2 V;
- increases the voltage for the entity E2 by 0.04 V;
- increases the voltage for the entity E3 by 0.03 V;
- decreases the voltage for the entity E4 by 0.4 V.

To decrease the voltage for the entity E4, it is therefore necessary to act preferably on the production of the entity E4 (0.4>0.3). However, since the entity E4 has no production means, it is therefore necessary to act preferably on the entity E1 to decrease the voltage for the entity E4 effectively.

By virtue of the data model MD, the monitoring and control method of the invention is capable of taking into account the effects of an increase or a decrease in one entity on another and is therefore configured to determine on which entity a capping action should be performed.

Figure 4A:
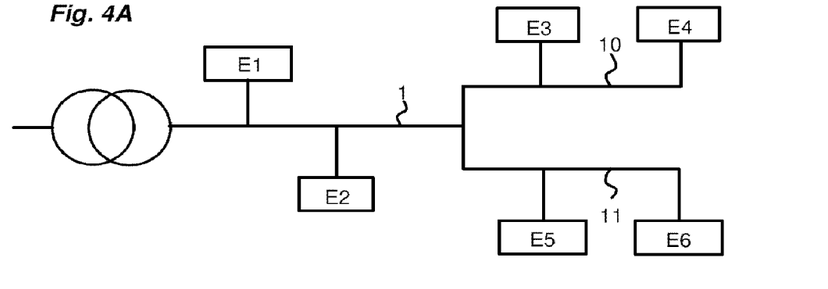
Figure 4B:
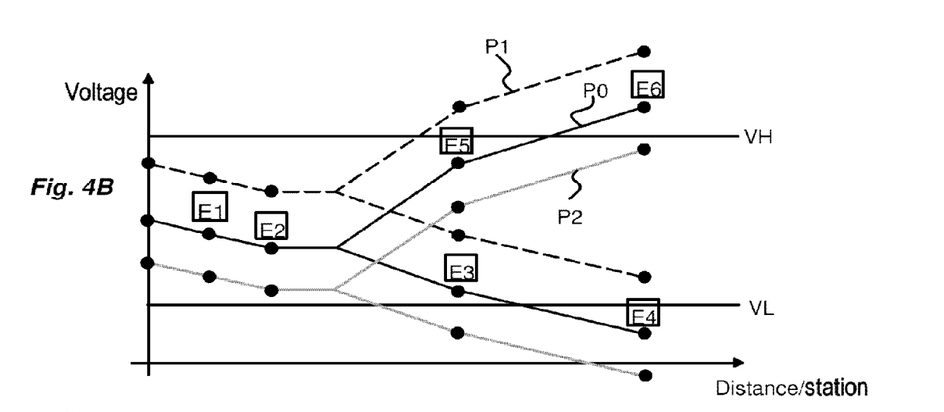
Figure 4C:
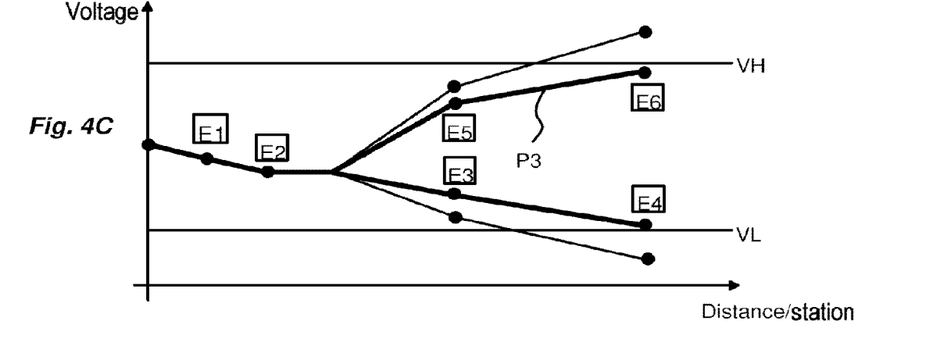

Second Operating Case—FIGS. 4A, 4B and 4C

The simplified network of FIG. 4A is considered, in which:
- E1 to E4=Consumer;
- E5 and E6=Consumer+Producer.

The low-voltage sub-network includes a main branch 1 on which the entities E1 and E2 are connected and two parallel secondary branches 10, 11 that are linked at a connection point to the main branch, a first secondary branch 10 on which the entities E3 and E4 are connected and a second secondary branch 11 on which the entities E5 and E6 are connected.

To simplify, all of the entities E1 to E6 are connected to the same phase of the low-voltage sub-network.

During intense sunshine, the entities E5 and E6 produce lots of electrical energy, which they inject into the electrical network. This results in the voltage on the second secondary branch 11 increasing. However, if the entities E3 and E4 consume a great deal, the voltage on the first secondary branch 10 tends to decrease. This is illustrated by the profile P0 shown in FIGS. 4B and 4C. In this profile, it is possible to see that, in the situation mentioned above, the voltage of the entity E6 at its connection point is higher than a voltage limit (VH) and the voltage of the entity E4 at its connection point is lower than a voltage limit (VL).

If the two effects occur at the same time, the voltage can no longer simply be adjusted using a tap-changing transformer station as is usually the case.

FIG. 4B illustrates the response that might be given nowadays using a tap-changing transformer station. A tap-changing transformer would allow undervoltage problems to be resolved while worsening overvoltage problems (profile P1 represented by the dashed lines—entity E4 returns to above VL—entity E5 exceeds the limit VH) or else overvoltage problems to be resolved while worsening undervoltage problems (profile P2—entity E6 falls back below the limit VH—entity E3 falls below the limit VL).

In this example, the matrix Au could take the following form:

| Client | 1 | 2 | 3 | 4 | 5 | 6 |
|---|---|---|---|---|---|---|
| 1 | −0.7 | −0.5 | −0.2 | −0.15 | −0.2 | −0.15 |
| 2 | −0.5 | −0.85 | −0.4 | −0.3 | −0.45 | −0.2 |
| 3 | −0.43 | −0.54 | −0.68 | −0.5 | −0.08 | −0.09 |
| 4 | −0.32 | −0.45 | −0.68 | −0.86 | −0.11 | −0.08 |
| 5 | −0.20 | −0.24 | −0.09 | −0.06 | −0.84 | −0.52 |
| 6 | −0.21 | −0.23 | −0.05 | −0.03 | −0.74 | −0.89 |

On the basis of this matrix, it is possible to observe that the two entities E5 and E6 have only very little effect on the two entities E3 and E4, and vice versa, by virtue of the low value of the coefficients present in the matrix, Based on these coefficients, the solution to the optimization problem will not involve capping the production of the entity E3 or E4 in the event of an overvoltage at the level of the entities E5 or E6 (and vice versa).

The solution of the invention furthermore makes it possible to appreciate that the production of the entities E5 and E6 leads to an increase in the voltage on their branch while the consumption of the entities E3 and E4 leads to a decrease in the voltage on their branch. By determining on which entities the actions of capping and suppressing should be performed, the solution of the invention makes it possible to obtain a voltage profile (Profile P3—FIG. 4C) allowing all of the entities Ei to be returned to within the operating limits of the low-voltage sub-network.

It is understood that the solution of the invention thus presents numerous advantages, among which:
- it does not require the plan of the electrical network to be reconstructed, as is often done in the prior art;
- it may allow the electrical network to be controlled on the basis of a single data model, adapted to the data pair being monitored.

The invention claimed is:

1. A method for monitoring and controlling an electrical network that comprises at least one transformer station (P) delimiting a medium-voltage sub-network and a low-voltage sub-network and a plurality of entities (Ei) that are connected to a determined voltage in the low-voltage sub-network, each entity being a consumer and/or a producer of electricity in the low-voltage sub-network, said method being implemented by a monitoring and control system comprising at least one processing unit, wherein said method further comprises:
- a step of acquiring an amount of electrical power consumed and/or produced by each entity (Ei) of the low-voltage sub-network at successive time intervals;
- a step of determining, at each new time interval, a production and/or consumption quota (q) to be attributed to each entity (Ei);
- a step of determining a minimum ($q^{min}(t)$) and a maximum ($q^{max}(t)$) production and/or consumption quota value to be observed for each entity (Ei) taking into account the amount of electrical power consumed and/or produced at a time interval ($p_{cons}$ (t−1), $p_{prod}$(t−1)) preceding said new time interval;
- a step of determining a projected consumed and/or produced amount of electrical power ($\widetilde{p_{cons}(t)}$, $\widetilde{p_{prod}(t)}$) for each entity, based on said consumed and/or produced amount of electrical power acquired at a time interval preceding said new time interval;

said production and/or consumption quota (q) being a solution to an optimization problem taking into account:
at least one unique data model (MD1, MD2) acquired by learning, applied at each new time interval and including data that are representative of an effect of the amount of electrical power consumed and/or produced by each entity (Ei) on at least one monitored electrical quantity;
technical constraints to be observed for said at least one monitored quantity;
said determined minimum and maximum production and/or consumption quota values;
said determined projected consumed and/or produced amount of electrical power for each entity;
an optimization function selected to allocate the production and/or consumption quotas to the entities;
a step of determining control data (Dx) on the production and/or on the consumption of electricity to be applied to one or more entities of the low-voltage sub-network taking into account each determined production and/or consumption quota.

2. The method according to claim 1, wherein said at least one monitored electrical quantity corresponds to the voltage standard of each entity at its connection point.

3. The method according to claim 2, wherein said constraints to be observed for said at least one monitored electrical quantity correspond to a minimum voltage value ($u^{min}$) and a maximum voltage value ($u^{max}$) for each entity (Ei).

4. The method according to claim 1, wherein said at least one monitored electrical quantity corresponds to the electrical power passing through the transformer station.

5. The method according to claim 4, wherein said constraints to be observed for said at least one monitored electrical quantity correspond to a minimum value ($p_{trans}^{min}$) of power passing through the transformer station (P) and a maximum value ($p_{trans}^{max}$) of power passing through the transformer station (P).

6. The method according to claim 1, wherein said at least one monitored electrical quantity corresponds to the standard for the amperage passing through a cable.

7. The method according to claim 1, wherein said optimization function is selected from:
maximizing the sum of the production and/or consumption quotas attributed to the entities (Ei);
maximizing the equity of the consumption restrictions between the entities; or
maximizing the logarithm of the power attributed to each entity (Ei).

8. The method according to claim 1, wherein the step of determining a minimum ($q^{min}(t)$) and a maximum ($q^{max}(t)$) production and/or consumption quota value to be observed for each entity (Ei) is carried out while taking into account technical data (D20) relating to each entity (Ei), selected from one or more of the following data:
a level of power attributed to each entity (Ei) according to its supply contract;
data relating to the electricity production solution installed within each producer entity;
a maximum amount of cappable power or energy per entity;
data relating to the storage capacity of the entity (Ei) if this entity is a producer.

9. The method according to claim 1, comprising a step of determining the number of new electrical data on the electrical network and a step of updating said at least one data model (MD1, MD2) of the electrical network when enough acquired electrical data are available.

10. A system for monitoring and controlling an electrical network that comprises at least one transformer station (P) delimiting a medium-voltage sub-network and a low-voltage sub-network and a plurality of entities (Ei) that are connected to a determined voltage in the low-voltage sub-network, each entity being a consumer and/or a producer of electricity in the low-voltage sub-network, wherein said system comprises:
a module for acquiring an amount of electrical power consumed and/or produced by each entity (Ei) of the low-voltage sub-network at successive time intervals;
a control module (M2) configured:
to determine, at each new time interval, a production and/or consumption quota (q) to be attributed to each entity (Ei);
to determine a minimum ($q^{min}(t)$) and a maximum ($q^{max}(t)$) production and/or consumption quota value to be observed for each entity (Ei) taking into account the amount of electrical power consumed and/or produced at a time interval ($p_{cons}(t-1)$, $p_{prod}(t-1)$) preceding said new time interval;
to determine a projected consumed and/or produced amount of electrical power ($\widetilde{p_{cons}(t)}$, $\widetilde{p_{prod}(t)}$) for each entity, based on said consumed and/or produced amount of electrical power acquired at a time interval preceding said new time interval;
said production and/or consumption quota (q) being a solution to an optimization problem taking into account:
at least one unique data model (MD1, MD2) acquired by learning, applied at each new time interval and including data that are representative of an effect of the amount of electrical power consumed and/or produced by each entity (Ei) on at least one monitored electrical quantity;
technical constraints to be observed for said at least one monitored quantity;
said determined minimum and maximum production and/or consumption quota values;
said determined projected consumed and/or produced amount of electrical power for each entity;
an optimization function selected to allocate the production and/or consumption quotas to the entities;
to determine control data (Dx) on the production and/or on the consumption of electricity to be applied to one or more entities of the low-voltage sub-network taking into account each determined production and/or consumption quota.

11. The system according to claim 10, wherein said at least one monitored electrical quantity corresponds to the voltage standard of each entity at its connection point.

12. The system according to claim 11, wherein said constraints to be observed for said at least one monitored electrical quantity correspond to a minimum voltage value ($u^{min}$) and a maximum voltage value ($u^{max}$) for each entity (Ei).

13. The system according to claim 10, wherein said at least one monitored electrical quantity corresponds to the electrical power passing through the transformer station.

14. The system according to claim 13, wherein said constraints to be observed for said at least one monitored electrical quantity correspond to a minimum value ($p_{trans}^{min}$)

of power passing through the transformer station (P) and a maximum value ($p_{trans}^{max}$) of power passing through the transformer station (P).

15. The system according to claim 10, wherein said at least one monitored electrical quantity corresponds to the standard for the amperage passing through a cable.

16. The system according to claim 10, wherein said optimization function is selected from:
- maximizing the sum of the production and/or consumption quotas attributed to the entities (Ei);
- maximizing the equity of the consumption restrictions between the entities; or
- maximizing the logarithm of the power attributed to each entity (Ei).

17. The system according to claim 10, wherein the control module (M2) is configured to determine a minimum ($q^{min}(t)$) and a maximum ($q^{max}(t)$) production and/or consumption quota value to be observed for each entity (Ei) while taking into account technical data (D20) relating to each entity (Ei), selected from one or more of the following data:
- a level of power attributed to each entity (Ei) according to its supply contract;
- data relating to the electricity production solution installed within each producer entity;
- a maximum amount of "cappable" power or energy per entity;
- data relating to the storage capacity of the entity (Ei) if this entity is a producer.

18. The system according to claim 10, comprising a learning module (M1) configured to determine a number of new electrical data on the electrical network and an operation of updating said at least one data model (MD1, MD2) of the electrical network when enough acquired electrical data are available.

\* \* \* \* \*